(12) United States Patent
Lu et al.

(10) Patent No.: US 11,863,449 B2
(45) Date of Patent: Jan. 2, 2024

(54) COMMUNICATION DEVICE AND NETWORK MANAGEMENT METHOD

(71) Applicant: Realtek Semiconductor Corporation, Hsinchu (TW)

(72) Inventors: Kuo-Cheng Lu, Hsinchu (TW); Chun-Da Wu, Hsinchu (TW); Yu-Hsiu Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 99 days.

(21) Appl. No.: 17/065,674

(22) Filed: Oct. 8, 2020

(65) Prior Publication Data

US 2021/0409329 A1 Dec. 30, 2021

(30) Foreign Application Priority Data

Jun. 30, 2020 (TW) .................. 109122114

(51) Int. Cl.
*H04L 45/7453* (2022.01)
*H04L 47/62* (2022.01)
*H04L 47/2441* (2022.01)
*H04L 49/90* (2022.01)

(52) U.S. Cl.
CPC ...... *H04L 45/7453* (2013.01); *H04L 47/2441* (2013.01); *H04L 47/6215* (2013.01); *H04L 49/90* (2013.01)

(58) Field of Classification Search
CPC ............ H04L 45/7453; H04L 47/2441; H04L 47/6215; H04L 49/90; H04L 43/02
See application file for complete search history.

(56) References Cited

U.S. PATENT DOCUMENTS

| | | | |
|---|---|---|---|
| 11,075,847 B1 * | 7/2021 | Kwan | H04L 47/283 |
| 2010/0260337 A1 | 10/2010 | Song et al. | |
| 2016/0315880 A1 * | 10/2016 | Guo | H04L 43/04 |
| 2017/0264555 A1 * | 9/2017 | Yonezu | H04L 45/745 |
| 2019/0182160 A1 | 6/2019 | Bengough et al. | |
| 2019/0379606 A1 * | 12/2019 | Tu | H04L 47/2483 |
| 2019/0386913 A1 | 12/2019 | Wei | |
| 2020/0136971 A1 * | 4/2020 | Cohen | H04L 9/0833 |

\* cited by examiner

*Primary Examiner* — Nishant Divecha

(74) *Attorney, Agent, or Firm* — Locke Lord LLP; Tim Tingkang Xia, Esq.

(57) ABSTRACT

A communication device which is configured to receive a data flow includes a monitor port and a packet processor. The monitor port is configured to receive a packet of the data flow. The packet processor is coupled to the monitor port, and the packet processor is configured to compute a digest value of the packet and compute an identification code of the packet according to the digest value of the packet, and the packet processor searches a status value associated with the identification code in a lookup table so as to determine whether a dropping event of the data flow is recorded.

16 Claims, 7 Drawing Sheets

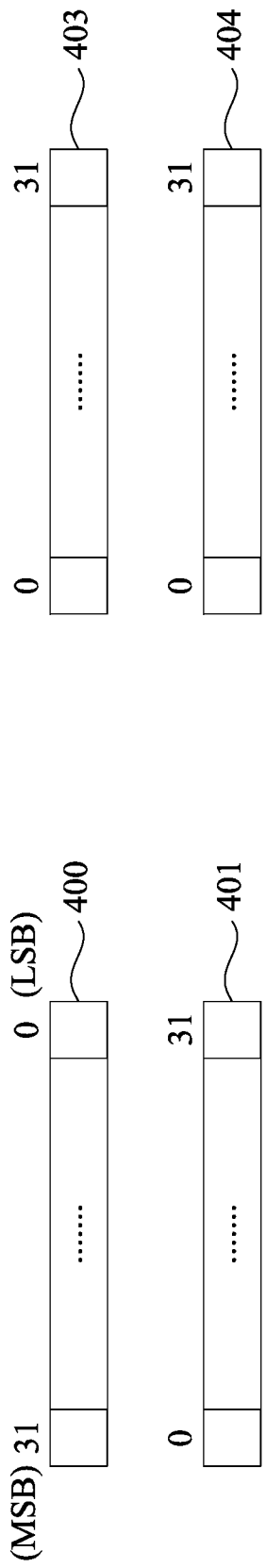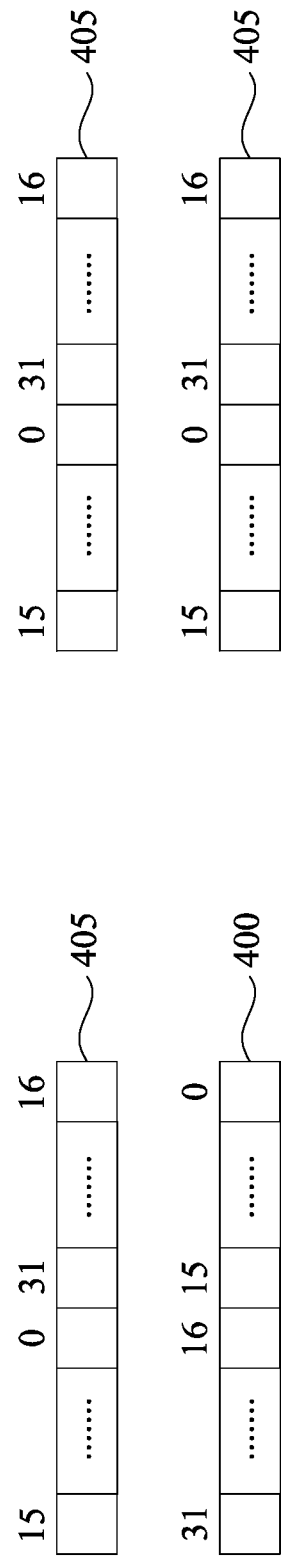

COMMUNICATION DEVICE AND NETWORK MANAGEMENT METHOD

CROSS-REFERENCE TO RELATED APPLICATION

This application claims priority to and the benefit of Taiwan Application Serial Number 109122114, filed on Jun. 30, 2020, the entire content of which is incorporated herein by reference as if fully set forth below in its entirety and for all applicable purposes.

BACKGROUND

Field of Disclosure

The disclosure generally relates to electric devices and management methods, and more particularly, to communication devices and network management methods.

Description of Related Art

The Ethernet switch is responsible for sending packets, but the packets will be dropped because of the quality of service (QoS) policy or some forwarding mechanism. In the situation, the network administrator has to find out why the packets are dropped by analyzing the counter recorded in the management information base (MIB) of each switch in the network topology. However, when the management information base is sent to the network management center, the problem and its occurring time checked by the network administrator will not necessarily be synchronized because of the large number of transmissions. Furthermore, the management information base may be lost during transmitting in the network, such that when and why the packet is dropped can not be traced.

The network telemetry is another method for network management. However, the network telemetry provides only for checking the content of the original packet. The path of the packet and the quality of service can not be traced. Additional hardware should be configured for putting the required data into the original packet, and the path of the packet and the quality of service can be traced then. However, the method requires additional hardware cost and network bandwidth, and the format of the header for putting data into the original packet does not specify as uniform standard.

Accordingly, how to obtain information on when and why the packet is dropped and the packet content is a problem urgent to be solved.

SUMMARY

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

One aspect of the present disclosure is to provide a communication device that is configured to receive a data flow, and the communication device includes a monitor port and a packet processor. The monitor port is configured to receive a packet of the data flow. The packet processor is coupled to the monitor port, and the packet processor is configured to compute a digest value of the packet and compute an identification code of the packet according to the digest value of the packet, and the packet processor searches a status value associated with the identification code in a lookup table so as to determine whether a dropping event of the data flow is recorded.

One aspect of the present disclosure is to provide a network management method which is configured to analyze a data flow, and the network management method includes steps of receiving a packet of the data flow; computing a digest value of the packet; and computing an identification code of the packet according to the digest value of the packet, and searching a status value associated with the identification code in a lookup table so as to determine whether a dropping event of the data flow is recorded.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

FIGS. 4A to 4D are diagrams for hash algorithms according to some embodiments of the present disclosure.

DETAILED DESCRIPTION

Figure 1:
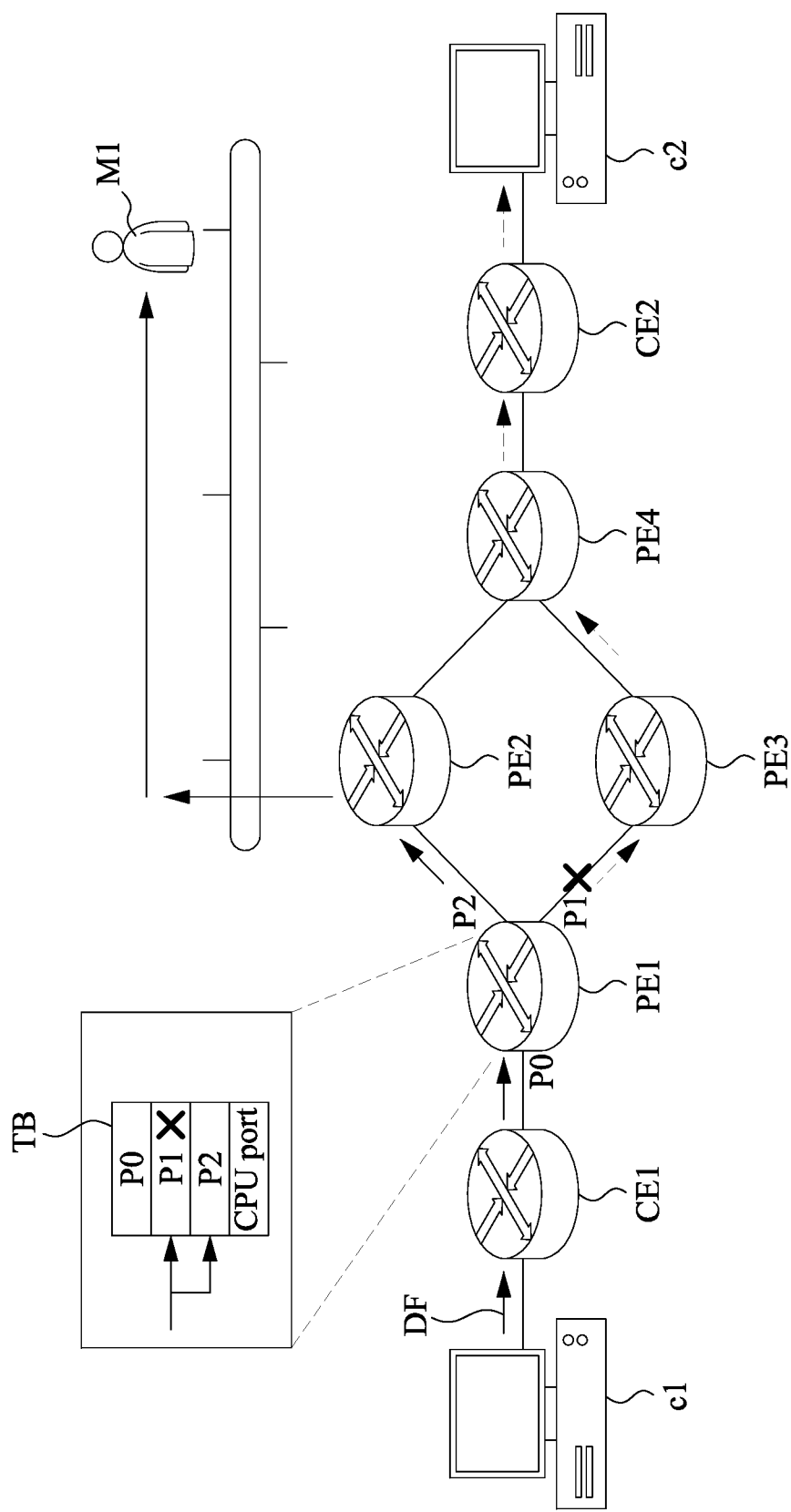
FIG. 1 depicts a diagram illustrating a configuration of communication devices according to some embodiments of the present disclosure.

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 depicts a diagram illustrating a configuration of communication devices according to some embodiments of the present disclosure. The communication device PE1 stores a destination-port forwarding table TB. As shown in FIG. 1, a client device c1 plans to send a data flow DF to a client device c2. In a normal situation, a communication device PE1 forwards the data flow to the data flow through a port P1. The forwarding path should be the path of the communication devices CE1-PE1-PE3-PE4-CE2. However, the communication device PE1 may be configured incorrectly or other reasons to drop a packet of the data flow. For example, VLAN member portlist is not configured properly, such that the packet is dropped because a misconfiguration that the packet is not permitted to pass the VLAN filtering of egress port P1 is made.

For monitoring the reasons why the packet is dropped, the communication device PE1 executes an event monitoring process.

In some embodiments, as shown in FIG. 1, a monitor port P2 is set on the communication device PE1. For example, when the packet is dropped by the VLAN filter of the egress port, the packet will be redirected to the monitor port P2. At this time, after a header of the packet is modified to add some information, the modified packet will be sent to a monitoring center M1, such that a network administrator can coordinate information of the packets which are dropped to monitor a dropping event.

In some embodiments, a monitor port is set on the communication device PE1 (e.g., the CPU port of the destination-port forwarding table TB in FIG. 1). When a determination that the packet should be dropped is made, the monitor port receives the dropped packet to execute the following diagnostic process.

Figure 2:
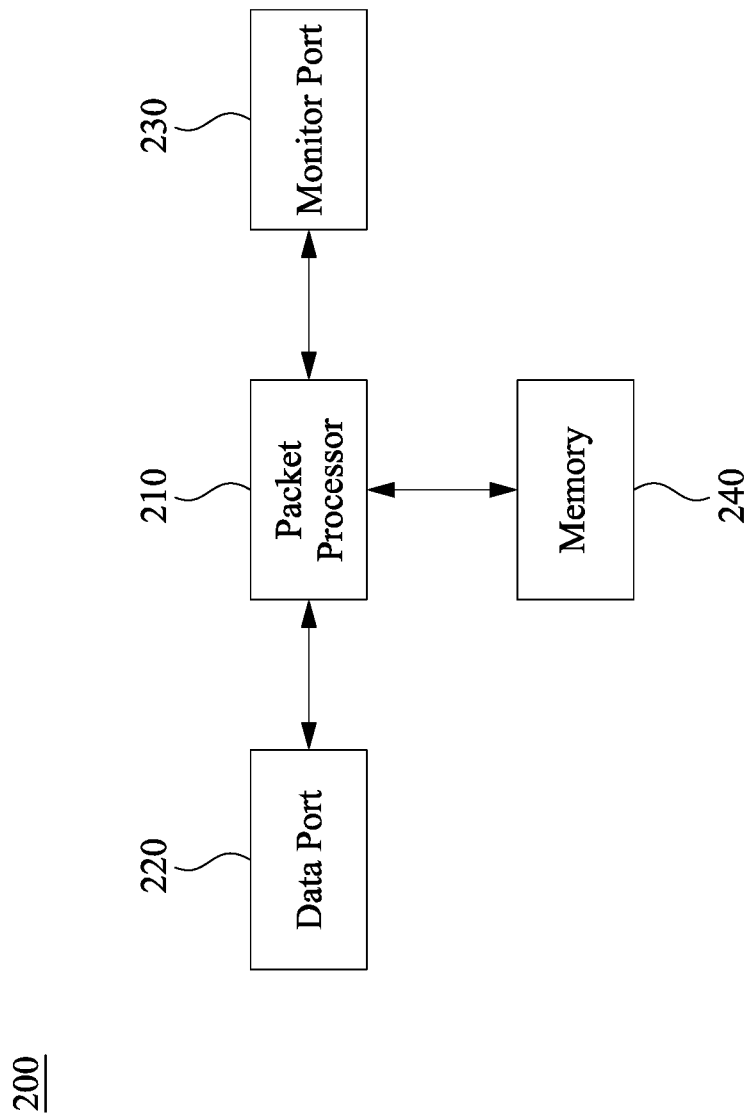
FIG. 2 depicts a block diagram illustrating the communication device according to some embodiments of the present disclosure.

Reference is made to FIG. 2. FIG. 2 depicts a block diagram illustrating the communication device 200 according to some embodiments of the present disclosure. As shown in FIG. 2, the communication device 200 includes a packet processor 210, a data port 220, a monitor port 230, and a memory 240. The packet processor 210 is coupled to the port 220, the monitor port 230, and the memory 240. The data port 220 is configured to execute a data packet receiving/forwarding. The communication device 200 includes a plurality of data ports 220. For the sake of brevity, one data port 220 is shown in the present disclosure as an embodiment. For example, the communication device 200 receives a packet of data flow through the data port 220. If the communication device 200 determines that the packet should be dropped, the packet will be redirected to the monitor port 230. The monitor port 230 is the monitor port (P2) or the monitor port (CPU port) in FIG. 1.

Figure 3:
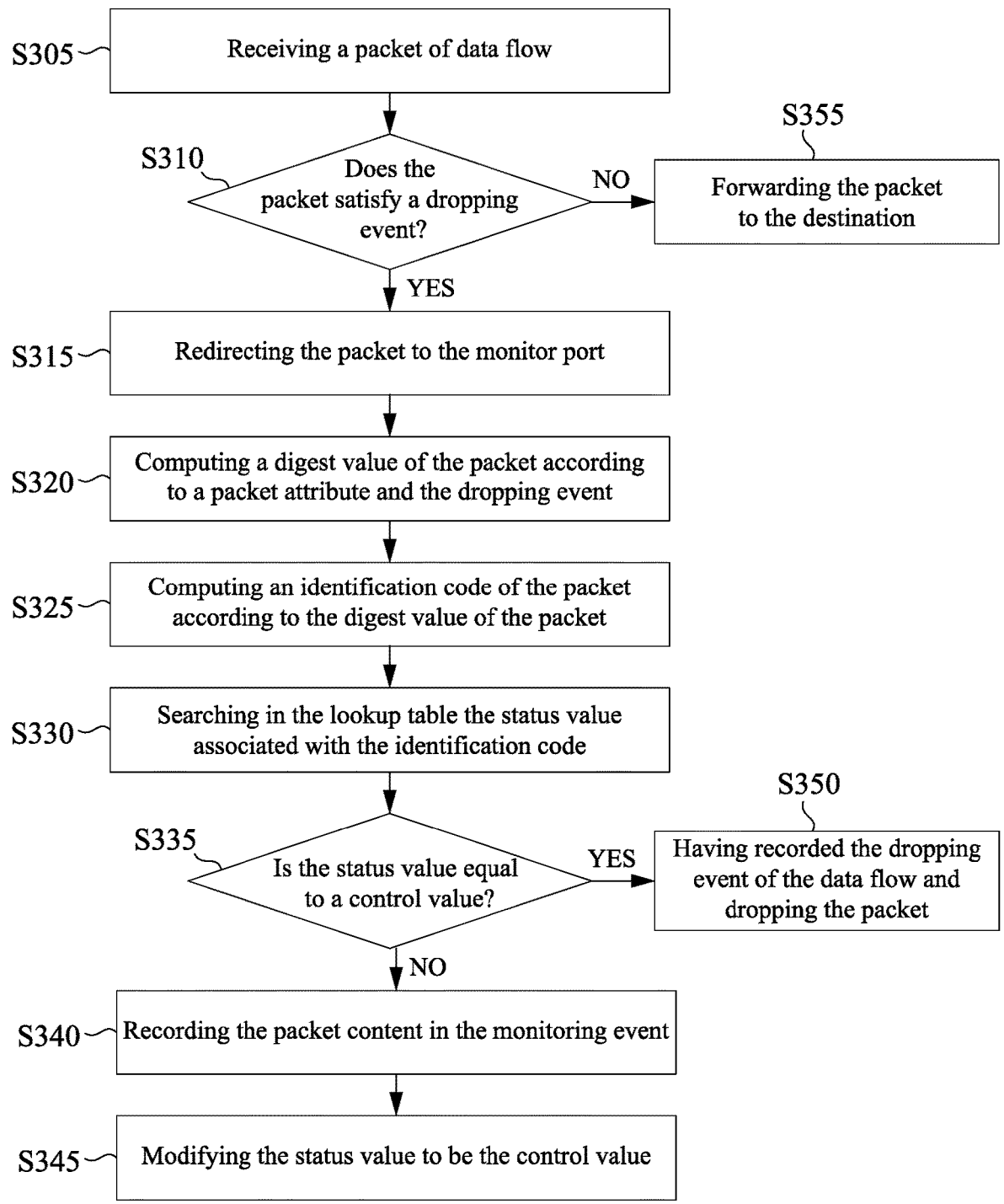
FIG. 3 is a flow chart illustrating a network management method according to some embodiments of the present disclosure.

For further showing descriptions of the communication device 200 of the disclosure, reference is made incorporating with FIG. 3. FIG. 3 is a flow chart illustrating a network management method according to some embodiments of the present disclosure.

In step S305, receiving a packet of data flow through the data port 220 is performed. In some embodiments, because the packets of the same data flow have the same attribute, the communication device 200 can identify the data flow of the packets according to the packet attribute.

In step S310, determining whether the packet satisfies a dropping event is performed. The dropping event can be, but is not limited to, the event that the packet carries mismatched or wrong information such that the correct destination port can not be found, the packet is the unauthorized packet or the intrusion packet, the packets can not be stored and forwarded because the communication device 200 has no enough memory spaces, a lookup table miss occurs, and so on. Accordingly, the packet is determined to be dropped.

In some embodiments, if a determination that the packet does not satisfy a dropping event is made, it represents that the packet is normal and in step S355 the data forwarding process is performed to send the packet to the destination.

If a determination that the packet satisfies the dropping event is made, in step S315 the packet is redirected to the monitor port 230. In some embodiments, the packet is stored in the memory 240 through the monitor port 230. The memory 240 includes a plurality of queues, and each queue has its corresponding priority. Based on the packet attributes and the packet priorities, when the packets are redirected, the packets will be distributed to the queues which have different priorities. The packet processor 210 accesses the packet in the queues according to the priority of the queues to execute the following diagnostic process (e.g., the packet in the queue having high priority will be diagnosed first).

In some embodiments, if a burst of monitoring packets are redirected to the monitor port 230, i.e., a large number of packets of the same type of data flows will be stored in the memory 240, the communication device 200 has to diagnose a large number of packets which belong to the same type of data flows, such that the problem of wasting computing resources occurs. For preventing the problem, in some embodiments, the communication device 200 executes a suppression filter process. In the suppression filter process, only the first packet of the same data flow which is received by the communication device 200 is redirected to the monitor port 230. If one packet which belongs to the same data flow is diagnosed and the dropping event occurs to the following packets which belong to the same data flow, the following packets will not be redirected to the monitor port 230. Therefore, the packet processor 210 has to process only one packet of the same data flow without wasting time and storage space due to the dropping event of the same data flow. The suppression filter process is shown below.

First, the communication device 200 classifies the data flow. In step S320, computing a digest value of the packet according to a packet attribute and the dropping event by the packet processor 210 is performed. The packet attribute can be, but is not limited to, the destination/source media access control (MAC) address, the destination/source IP address, the IEEE 802.3 Ethertype, the VLAN identifier, the L4 destination/source port, the tunnel header, the IPv6 flow label.

In some embodiments, the digest value is computed by using the hash algorithm, the packet attribute, and the dropping event. For example, the packet content is a binary value of 32-bit length. FIGS. 4A to 4D are diagrams for hash algorithms according to some embodiments of the present disclosure.

In some embodiments, as shown in FIG. 4A, the hash algorithm reverses the content of an original packet 400 such that the most significant bit of the original packet 400 is reversed to the least significant bit of the original packet 400 to obtain a packet 401. And then, the exclusive-or computation is performed at the original packet 400 and the packet 401 which are the inputs, and the result of the exclusive-or computation is a first digest value of the 400.

In some embodiments, as shown in FIG. 4B, the hash algorithm reverses the original packet 400 to obtain two reversed packets: packet 403 and packet 404. And then, the exclusive-or computation is performed at the packet 403 and the packet 404 which are the inputs, and the result of the exclusive-or computation is a second digest value of the packet 400.

In some embodiments, as shown in FIG. 4C, the hash algorithm splits the original packet 400 into two segments and reverses the order of the two segments to obtain the packet 405. And then, the exclusive-or computation is performed at the packet 405 and the original packet 400 which are the inputs, and the result of the exclusive-or computation is a third digest value of the packet 400.

In some embodiments, as shown in FIG. 4D, the hash algorithm performs the exclusive-or computation at the two packets 405 which are the inputs, and the result of the exclusive-or computation is a fourth digest value of the packet 400. It should be noted that the illustration of FIG. 4A to FIG. 4D is provided as some embodiments of the disclosure and the hash algorithms are not limited herein.

In step S325, computing an identification code of the packet according to the digest value of the packet is performed. For example, the length of the digest value is 32-bit. The communication device 200 allocates a lookup table which size is $2^{32}$ for storing whether the digest value is recorded. However, for saving the memory space, in step S325 the length of the digest value is compressed to reduce the size of the lookup table. The lookup table stores the status value associated with the digest value.

In some embodiments, the length of the identification code is smaller than the length of the digest value. For example, the length of the digest value 32-bit is compressed into 14-bit. The digest value whose length is compressed is called the identification code. For example, the 32-bit digest value is split into three 14-bit data (the last segment has only 4-bit data and the other 10 bits are zero). The computation is executed on the three data, e.g., the exclusive-or, to obtain the identification code which length is 14-bit. The identification code corresponds to an address of the lookup table (e.g., address 0 to address $2^{14}$-1). The content which the address of the lookup table points to is the status value and the status value represents whether the packet corresponding to the digest value is received (described below). Therefore, when the lookup table is allocated with the size $2^{14}$, the lookup table can store the status value of the digest value whose length is 32-bit. In some embodiments, the length of the identification code is equal to the length of the digest value. The length of the digest value which is compressed is not limited herein.

In step S330, searching in the lookup table the status value associated with the identification code is performed. In some embodiments, because the hash algorithms are applied for computing the hash values, it may happen that different data flows have the same digest value (hash value), such that the collision will occur. Therefore, the method designs the solution that the same packet has more than one hash values to prevent the collision problem. The embodiment in the disclosure provides four hash algorithms and four lookup tables to respectively store the status value of the digest value corresponding to each data flow. It should be noted that the number of lookup tables is not limited and the scope of the disclosure includes two or more lookup tables to store the status value.

Figure 5A:
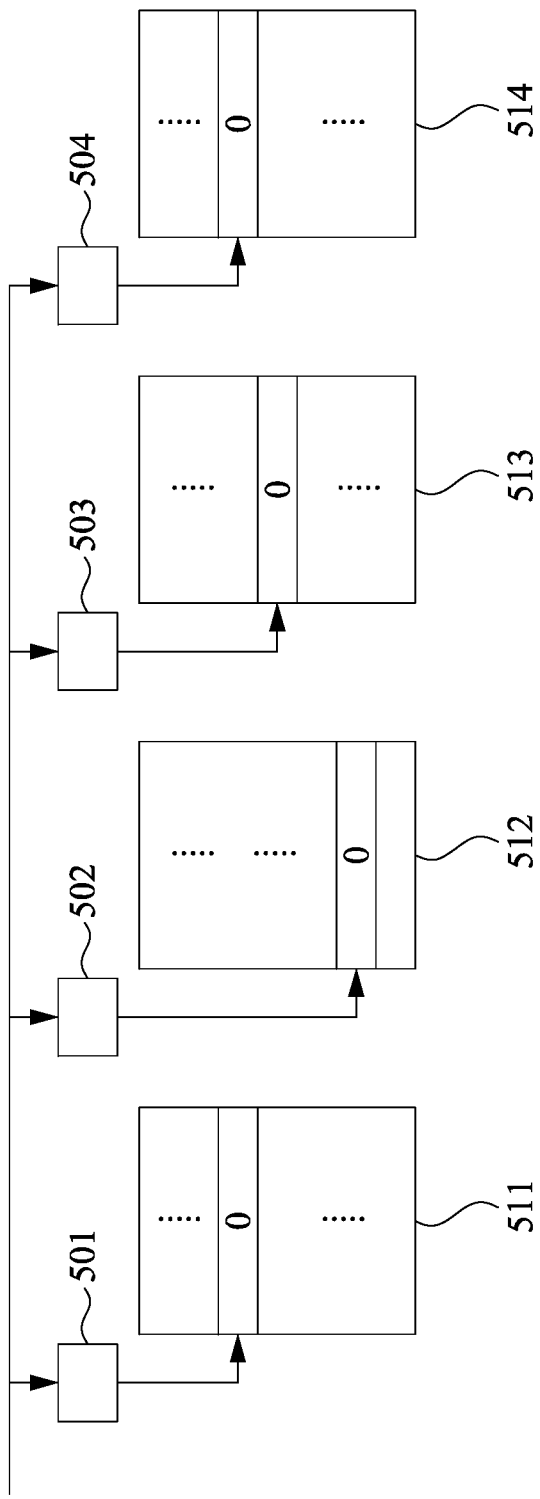
FIGS. 5A to 5C are diagrams of lookup tables according to some embodiments of the present disclosure.
Figure 5B:
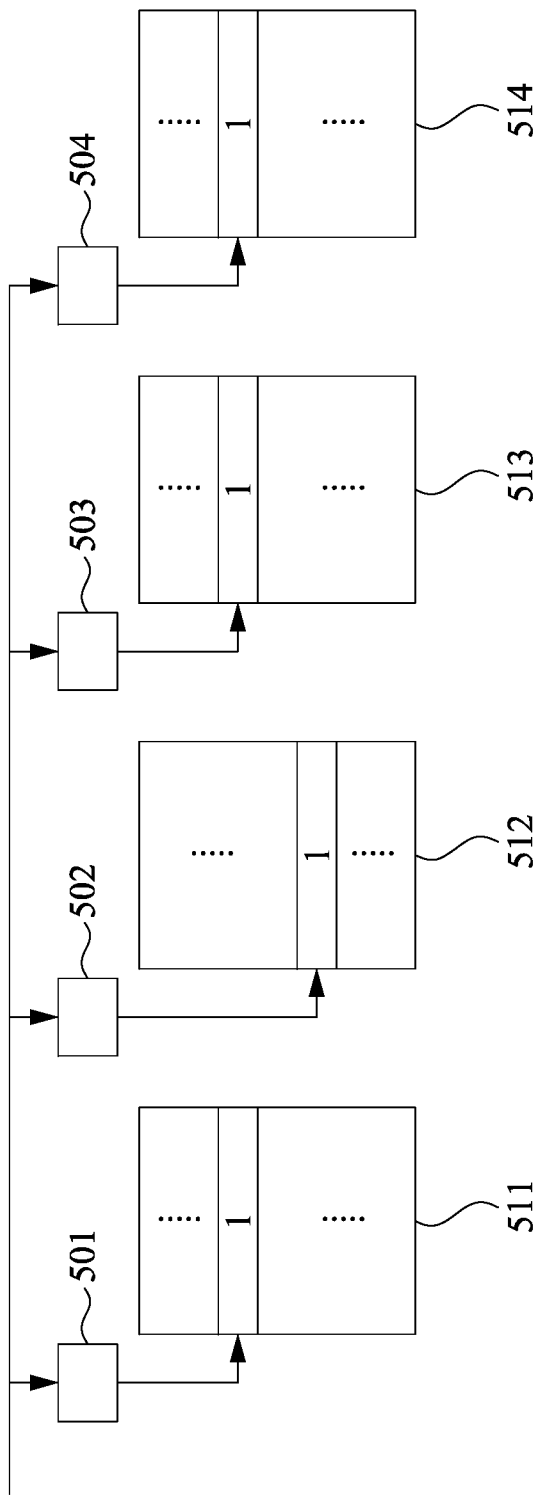
Figure 5C:
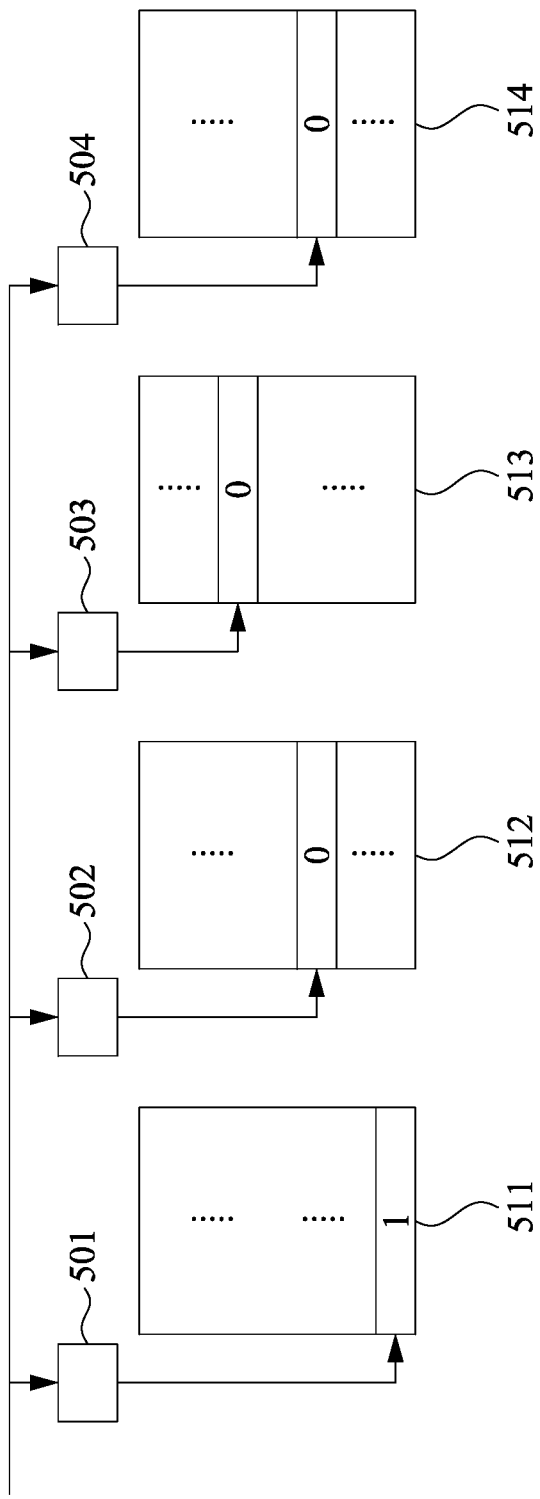

Reference is made to FIGS. 5A-5C. FIGS. 5A to 5C are diagrams of lookup tables according to some embodiments of the present disclosure. The digest value is compressed to generate the identification code. The identification code is computed by applying a first hash algorithm 501, a second hash algorithm 502, a third hash algorithm 503, and a fourth hash algorithm 504 to generate a first hash value, a second hash value, a third hash value, and a fourth hash value. On the other hand, the first lookup table 511 corresponds to the first hash algorithm 501 and the first status value is recorded into where the address of the first hash value points. Similarly, the second lookup table 512 corresponds to the second hash algorithm 502 and the second status value is recorded into where the address of the second hash value points. The third lookup table 513 corresponds to the third hash algorithm 503 and the third status value is recorded into where the address of the third hash value points. The fourth lookup table 514 corresponds to the fourth hash algorithm 504 and the fourth status value is recorded into where the address of the fourth hash value points. The packet processor 210 determines whether the data flow has been received according to the four status values. For example, when the status value is 0, it means that the communication device 200 has not processed the dropping event of the data flow. When the status value is 1, it means that the dropping event of the data flow has been processed.

In step S335, determining whether the status value is equal to or satisfies a control value is performed. In some embodiments, the status value is applied for determining whether the packet of the data flow is analyzed. It should be noted that the status value is one or more bits and the number of bits of the status value is not limited herein. A person of ordinary skill in the art can design the bit number based on the practical situation, for example, the status value is a 2-bit value to express four different status. In one embodiment, the status value is 1-bit. When the status value is 1, it means that communication device 200 has analyzed the packet of the data flow. Otherwise, when the status value is 0, it means that the communication device 200 has not analyzed the packet of the data flow. For the sake of brevity, the control value which is 1 is taken as an embodiment for showing whether the packet is analyzed, and a person of ordinary skill in the art can design the status and the value based on the practical situation.

As shown in FIG. 5A, the contents which the four addresses point to are the status values, which are 0, 0, 0, and 0 respectively. In other words, the communication device 200 does not analyze the packet of the data flow. Therefore, in step S340 the monitoring event records the packet. For example, the packet will be diagnosed and the diagnosed result is recorded to the monitoring event for the network administrator referring. In some embodiments, the packet content includes the timestamp that the packet is received, the dropping event associated with the packet, the ingress port and the egress port of the packet.

In step S345, modifying the status value to be the control value (e.g., 1) is performed. As shown in FIG. 5B, the status value corresponding to the identification code of the first lookup table to the fourth lookup table is modified to be 1, which represents that the situation of dropping the packet of the data flow is recorded.

In some embodiments, steps S305 to S330 are performed. The monitor port 230 receives the packet of the data flow and the status value corresponding to the packet is computed accordingly. Then in step S335, a determination that all the status values of the first lookup table to the fourth lookup table are 1, as shown in FIG. 5B, it represents that the situation of dropping the packet of the data flow is recorded (the control value is 1, for example). In step S350, the packet will be dropped accordingly. Therefore, the packet will not be processed in the diagnostic process (e.g., forwarding the packet to the monitoring center or recording the packet in the monitoring event).

It should be noted that if in step S335 only part of the lookup tables whose status value(s) is/are 1 (e.g., the status value of the first lookup table is 1 and the status values of the second to the fourth lookup tables are 0), as shown in FIG. 5C, it means that the collision occurs and the communication device 200 will still process the dropping event of the data flow. For example, the hash value of the first packet of the first data flow which is computed by using the first hash algorithm is 3173, and the content which is pointed by address 3173 is modified to be 1 in the previous dropping event. However, the hash value of the second packet of the second data flow which is computed by using the second hash algorithm is also 3173. Because the hash values of the second data flow are computed by the second to fourth hash algorithms and the status values which correspond to the hash values are all 0, the collision occurs between the hash values of the first packet and the second packet. Actually, in the embodiment, the communication device 200 does not process the second data flow. In the meantime, the communication device 200 will process the dropping event of the second data flow. Therefore, multiple hash algorithms are applied for decreasing the situation of determining by mistake that the data flow has been processed.

In some embodiments, the communication device 200 sets an aging value to the digest value of the data flow. For example, if the aging value of the digest value of the data flow is larger than a threshold value (e.g., the aging value counts increasingly to the threshold value 255) or is smaller than a threshold value (e.g, the aging value counts decreasingly to the threshold value 0), the status value of the lookup table will be erased. Therefore, the memory space can be freed to store the new status value of the data flow. In some embodiments, the communication device 200 will erase periodically (e.g., every day) all the status values of the lookup table. Therefore, the lookup table records status values according to the period of the data flow to increase efficiency.

As described above, the communication device and the network management method in the disclosure no additional hardware is needed for embedding the management information into the packet (i.e., the chip cost is reduced). The network administrator only has to set configurations of the communication device to forward the packet to the processor or specific port, such that the dropping packet can be monitored. Additionally, when the packet occurs the dropping event, the communication device records the management information base and gathers the statistics of the counter, and the communication device also records the packets having problems, their causes, and the timestamps. The communication device only has to record once (to reduce the processor loading) to generate the report for the network administrator and further inspections to reduce the time for troubleshooting.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication device configured to receive a data flow, wherein the communication device comprises:
   a monitor port configured to receive a packet of the data flow; and
   a packet processor coupled to the monitor port,
   wherein the packet processor is configured to compute, by using a first hash algorithm, a first digest value of the packet according to a packet attribute and to compute, by using a second hash algorithm, a second digest value of the packet according to the packet attribute in response to the packet processor determining that the packet satisfies a dropping event,
   wherein the packet processor further computes a plurality of identification codes of the packet respectively according to the first digest value and the second digest value of the packet, and the packet processor searches a plurality of status values associated with the plurality of identification codes in a plurality of lookup tables respectively, so as to determine whether the dropping event of the data flow is recorded,
   wherein the first hash algorithm is different from the second hash algorithm, and the first digest value is different from the second digest value, and
   wherein the packet processor is further configured to record a packet content in a monitoring event, modify the first status value of a first lookup table of the plurality of lookup tables to be the control value, and modify the second status value of a second lookup table of the plurality of lookup tables to be the control value in response to at least one of the following conditions being met:
   a first status value of the plurality of status values does not satisfy a control value, and
   a second status value of the plurality of status values does not satisfy the control value.

2. The communication device of claim 1, wherein the monitor port is further configured to receive the packet that satisfies the dropping event, and the packet processor is further configured to receive the packet from the monitor port, and before the packet is dropped, the packet processor computes the first digest value and the second digest value of the packet by using the packet attribute.

3. The communication device of claim 2, wherein the packet processor is further configured to compress the first digest value of a first length into one of the identification codes of a second length, wherein the second length is smaller than or equal to the first length.

4. The communication device of claim 1, wherein the packet processor is further configured to compress the first digest value into a first identification code of the plurality of identification codes, and compress the second digest value into a second identification code of the plurality of identification codes.

5. The communication device of claim 4, further comprising:
   a memory coupled to the packet processor, wherein the memory is configured to store the plurality of lookup tables, and the plurality of lookup tables comprises the first lookup table and the second lookup table, wherein the first lookup table corresponds to the first hash algorithm, and the second lookup table corresponds to the second hash algorithm.

6. The communication device of claim 5, wherein the memory further comprises a plurality of queues, each of the plurality of queues is configured to store the packet of the data flow that satisfies the dropping event, such that the packet processor accesses the packet of each of the plurality of queues according to a priority of each of the plurality of queues.

7. The communication device of claim 5, wherein the packet processor is further configured to search, in the first lookup table, the first status value of the plurality of status values associated with the first identification code to determine whether the first status value satisfies the control value, and search, in the second lookup table, the second status value of the plurality of status values associated with the second identification code to determine whether the second status value satisfies the control value.

8. The communication device of claim 7, wherein the packet processor is further configured to search the first lookup table to determine that the first status value satisfies the control value and search the second lookup table to determine that the second status value satisfies the control value, then drop the packet.

9. A network management method configured to analyze a data flow, wherein the network management method comprises:
receiving a packet of the data flow;
computing, by using a first hash algorithm, a first digest value of the packet according to a packet attribute in response to the packet satisfying a dropping event;
computing, by using a second hash algorithm, a second digest value of the packet according to the packet attribute in response to the packet satisfying the dropping event;
computing a plurality of identification codes of the packet respectively according to the first digest value and the second digest value of the packet, and searching a plurality of status values associated with the plurality of identification codes in a plurality of lookup tables respectively, so as to determine whether the dropping event of the data flow is recorded;
recording a packet content in a monitoring event in response to determining that at least one of the following conditions is met: (1) a first status value of the plurality of status values does not satisfy a control value, and (2) a second status value of the plurality of status values does not satisfy the control value; and
changing the first status value of a first lookup table of the plurality of lookup tables to be the control value and changing the second status value of a second lookup table of the plurality of lookup tables to be the control value,
wherein the first hash algorithm is different from the second hash algorithm, and the first digest value is different from the second digest value.

10. The network management method of claim 9, further comprising:
receiving the packet that satisfies the dropping event; and
computing the first digest value and the second digest value of the packet by using the packet attribute before dropping the packet.

11. The network management method of claim 10, wherein computing the plurality of identification codes of the packet comprises:
compressing the first digest value of a first length into one of the plurality of identification codes of a second length, wherein the second length is smaller than or equal to the first length.

12. The network management method of claim 9, further comprising:
compressing the first digest value into a first identification code of the plurality of identification codes, and compressing the second digest value into a second identification code of the plurality of identification codes.

13. The network management method of claim 12, further comprising
storing the first lookup table of the plurality of lookup tables, wherein the first lookup table corresponds to the first hash algorithm; and
storing the second lookup table of the plurality of lookup tables, wherein the second lookup table corresponds to the second hash algorithm.

14. The network management method of claim 13, further comprising:
storing the packet of the data flow that satisfies the dropping event in a plurality of queues; and
accessing the packet of each of the plurality of queues according to a priority of each of the plurality of queues.

15. The network management method of claim 13, further comprising:
searching, in the first lookup table, the first status value of the plurality of status values associated with the first identification code to determine whether the first status value satisfies the control value; and
searching, in the second lookup table, the second status value of the plurality of status values associated with the second identification code to determine whether the second status value satisfies the control value.

16. The network management method of claim 15, further comprising:
searching the first lookup table to determine that the first status value satisfies the control value and searching the second lookup table to determine that the second status value satisfies the control value, then dropping the packet.

* * * * *